(12) United States Patent
Fadavi-Ardekani et al.

(10) Patent No.: US 6,279,048 B1
(45) Date of Patent: *Aug. 21, 2001

(54) SYSTEM WAKE-UP BASED ON JOYSTICK MOVEMENT

(75) Inventors: Jalil Fadavi-Ardekani, Orefield; David Lawson Potts, Royersford; Walter G. Soto, Irvine; Avinash Velingker, Orefield, all of PA (US)

(73) Assignee: Lucent Technologies, Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,673

(22) Filed: Jul. 7, 1998

Related U.S. Application Data

(60) Provisional application No. 60/065,855, filed on Nov. 14, 1997.

(51) Int. Cl.[7] .............................. G06F 3/00; G06F 1/26; G06F 1/32
(52) U.S. Cl. ........................... 710/15; 710/5; 710/18; 713/320; 713/323
(58) Field of Search ........................... 710/2, 5, 14, 15, 710/62, 18; 713/300, 310, 323, 324; 273/148 R; 345/161

(56) References Cited

U.S. PATENT DOCUMENTS

| | | | |
|---|---|---|---|
| 5,247,655 | * | 9/1993 | Khan et al. ........................... 711/106 |
| 5,317,301 | * | 5/1994 | DeVolpi ................................ 338/128 |
| 5,424,756 | * | 6/1995 | Ho et al. .............................. 345/158 |
| 5,615,083 | * | 3/1997 | Burnett ................................. 361/686 |
| 5,675,309 | * | 10/1997 | DeVolpi ................................. 338/68 |
| 5,724,558 | * | 3/1998 | Svancarek et al. .............. 395/500.42 |
| 5,726,541 | * | 3/1998 | Glenn et al. ........................... 318/16 |
| 5,742,278 | * | 4/1998 | Chen et al. ........................... 345/156 |
| 5,754,869 | * | 5/1998 | Holzhammer et al. ............. 713/300 |
| 5,794,058 | * | 8/1998 | Resnick ................................ 713/324 |
| 5,839,959 | * | 11/1998 | Pelkey .................................... 463/36 |
| 5,842,028 | * | 11/1998 | Vajapey ................................ 713/310 |
| 5,848,281 | * | 12/1998 | Smalley et al. ..................... 713/323 |
| 5,874,944 | * | 2/1999 | Khoury ................................ 345/161 |
| 5,925,131 | * | 7/1999 | Novoa et al. ....................... 713/300 |
| 5,959,556 | * | 9/1999 | Shrader et al. ....................... 341/20 |
| 6,105,142 | * | 8/2000 | Goff et al. .......................... 713/324 |

* cited by examiner

Primary Examiner—Thomas Lee
Assistant Examiner—Chun Cao
(74) Attorney, Agent, or Firm—William H. Bollman

(57) ABSTRACT

The present invention provides a game port interface having a second processor interface in addition to an otherwise conventional first processor interface such that a second processor may directly poll the game port interface to detect movement of a joystick device while a first, host processor is in a low power mode. Thus, the second processor may identify movement in the joystick and initiate a wake up sequence in the first, host processor via a communication path between the two processor interfaces. The additional processor interface allows the second processor to poll the joystick without interfering with the normal operation of the joystick. The present invention provides the power savings benefits of maintaining a host processor in a low power mode while at the same allowing another processor which may or may not be in a reduced power mode to detect movement of the joystick and initiate a wake up sequence in the host processor in response thereto.

13 Claims, 3 Drawing Sheets

SYSTEM WAKE-UP BASED ON JOYSTICK MOVEMENT

This application claims priority from U.S. Provisional Application No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates generally to a computer or larger system which includes a processor capable of a low power mode and which is capable of exiting the low power mode upon receipt of an external input.

2. Background of Related Art

Many computers such as personal computers (PCs) include a game port interface for interfacing, e.g., with a joystick.

For instance, FIG. 2 is a block diagram depicting a conventional joystick device 400 interfaced with a conventional game port interface 450. The game port interface 450 is accessed by other devices in a larger system using a bus such as an Industry Standard Architecture (ISA) Bus 480.

The game port interface 450 conventionally includes a timer such as a 558 quad timer 460, and interface logic and appropriate tri-state buffering to form a bus interface, e.g., ISA interface 470.

The conventional joystick is comprised basically of two variable resistors, one in an x-axis direction and the other in a y-axis direction. Each of the variable resistors change resistance as the joystick changes position. Some joystick devices include more than one joystick. For example, a 4-axis joystick device 400 such as that shown in FIG. 1 includes two joysticks.

A conventional game port interface 450 is comprised basically of a capacitor in parallel with each variable resistor of the joystick device 400. Thus, respective timing constants T=RC are formed between each variable resistor and its respective capacitor in the game port interface 450. As each joystick in the joystick device 400 changes position, the timing constants formed by the parallel combination of the variable resistors and capacitors change.

The 558 quad timer 460 includes four timers within one package. All four timers in the 558 quad timer 460 may be used for the four variable resistors of the 4-axis joystick device 400. Alternatively, four 555 timers could be combined to form an equivalent timer element. Similarly, a 2-axis joystick device may use only two of four available timers in a 558 quad timer, or may use only two 555 timers.

FIG. 3 shows a timing diagram showing the operation of each of the timers in a game port interface.

In particular, as shown in waveform (a) of FIG. 3, each of the timers in the 558 quad timer 460 are triggered under normal operation by a fire enable signal 461, e.g., initiated by a host processor over the ISA bus 480 (FIG. 2). The fire enable signal 461 resets the respective timer and starts the measurement of the position of the joystick device 400 in the relevant axis.

Waveform (b) of FIG. 3 shows a resultant pulse or data signal 463 output by the 558 quad timer 460 enabled or triggered by the fire enable signal 461 shown in waveform (a). The length 488 of the data signal 463 corresponds to the RC time constant resulting from the present value of the variable resistance in the relevant axis of the joystick device 400 and the value of the capacitor in parallel with that variable resistance. Thus, as FIG. 3 shows, the width of the data signal 463 represents the position of the joystick in the relevant axis.

FIG. 4 is a more detailed diagram of a conventional game port interface 450 in a computer such as a personal computer (PC).

In particular, the conventional game port interface 450 includes the 558 or similar quad timer 460, with capacitors 622–628 associated respectively with four input lines corresponding to 4 axes of the joystick device 400. Series resistors 632–638 prevent a short circuit condition across an input to the 558 quad timer 460. The joystick device 400 shown in FIG. 4 includes four axes of motion, i.e., two joysticks, and two buttons associated with each of the two joysticks.

The conventional game port interface 450 further includes a bus interface 470 such as an ISA bus interface. The ISA bus interface 470 includes an address decoder 662 and a data latch 664. The address decoder 662 provides appropriate fire enable signals 661 to the 558 quad timer 460, and an enable signal 665 to the data latch 664. Resistors 602–608 prevent floating inputs to the data latch 664 when the joystick device 400 is not connected to the game port interface 450, and capacitors 612–618 provide a filtering mechanism to, e.g., prevent spikes in signals to the data latch 664.

To conserve power (e.g., battery power), computers or other processor systems (particularly laptop computers and the like) enter a power down mode after a period of non-use. Conventional game port interfaces, which are typically triggered by the computer or processor system, thus cannot conventionally detect movement of a joystick while the computer or processor system is in a low power or power down mode. Conventionally, an external device such as a Universal Asynchronous Receiver Transmitter (UART) must communicate with the processor 601 to draw the processor 601 out of the power down mode. However, this requires action by a user other than through the joystick 400, wasting time and increasing the required activity of the user.

For instance, a processor 601 as shown in FIG. 4 accesses and polls the joystick device 400 via the ISA bus 480 during normal operation by causing a fire enable signal 661 to trigger the 558 quad timer 460. However, while the processor 601 is in a power down mode the 558 quad timer 460 does not receive the fire enable signal 661.

There is thus a need for an interface and method which allows a joystick to wake up a processor from a low power or power down mode.

SUMMARY OF THE INVENTION

It is one aspect of the present invention to provide a system comprising a processor having a joystick interface, and a joystick coupled to the joystick interface. The processor is adapted to sense a change in a position of the joystick while the processor is in a sleep mode, and is also adapted to initiate a processor wake-up procedure upon sensing the change in the joystick position.

It is another aspect of the present invention to provide a game port interface comprising a timing circuit to sense a change in a condition of an external device interfacing with the game port interface. A first data bus interface provides a first processor access to the condition of the external device, and a second data bus interface provides a second processor access to the condition of the external device.

A method of polling a game port interface in accordance with the present invention comprises polling the game port interface from a first processor. The first processor is placed in a low power mode, and the game port interface is polled from a second processor.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Conventional computers or host processors cannot efficiently wake up out of a low power mode using a joystick because the computer or host processor which normally polls the joystick is asleep. The present invention provides a game port interface having a second processor interface in addition to that of the computer or host processor so that a second processor may poll the joystick while the controller or host processor is in a low power mode. Thus, a second processor may poll the game port interface while the host processor is in a low power mode and identify movement in the joystick and initiate a wake up sequence in the controller or host processor. The additional processor interface allows the second processor to poll the joystick without interfering with the normal operation of the joystick. Thus, the present invention provides the benefits of maintaining a controller or host processor in a low power mode while at the same time allowing a means to initiate a wake up sequence in the host processor upon movement of the joystick.

Figure 1:
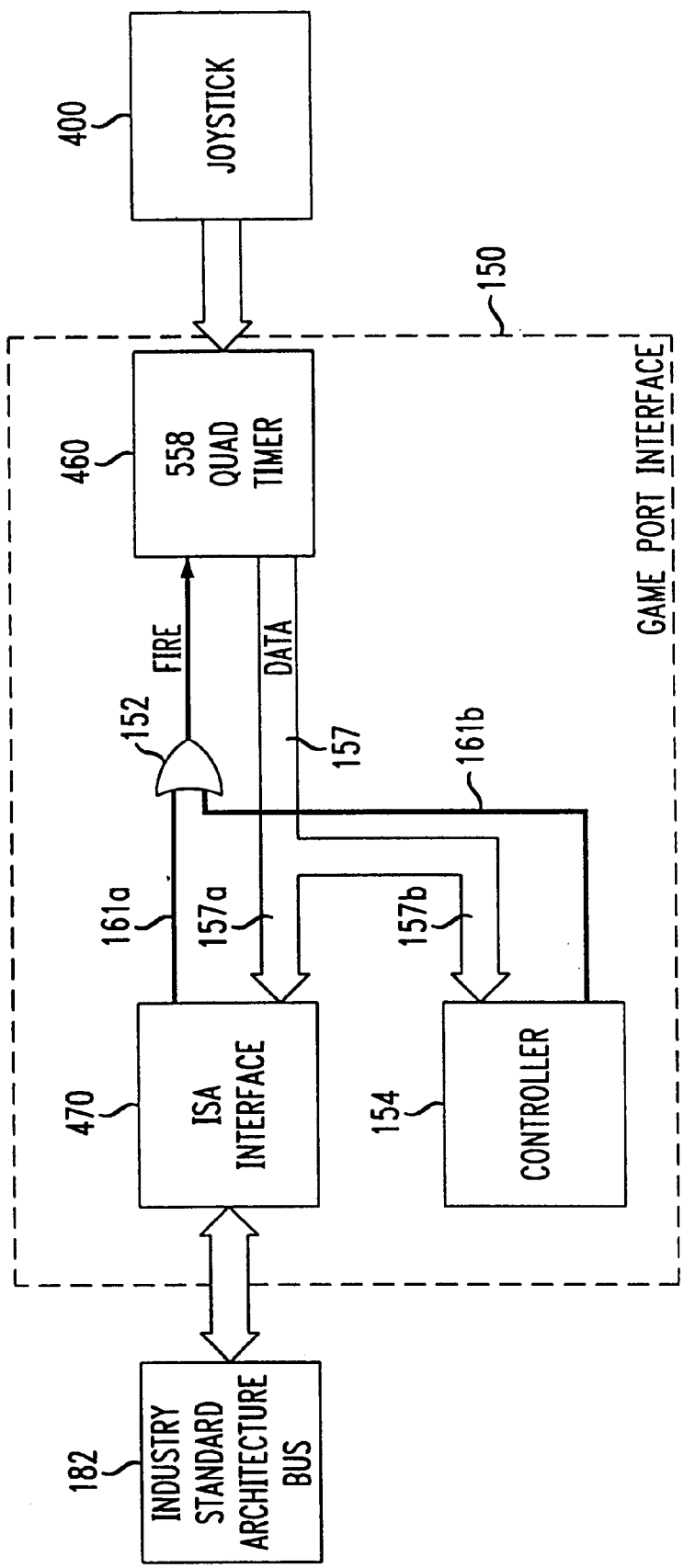
FIG. 1 shows an embodiment of a joystick interface in accordance with the principles of the present invention.
Figure 2:
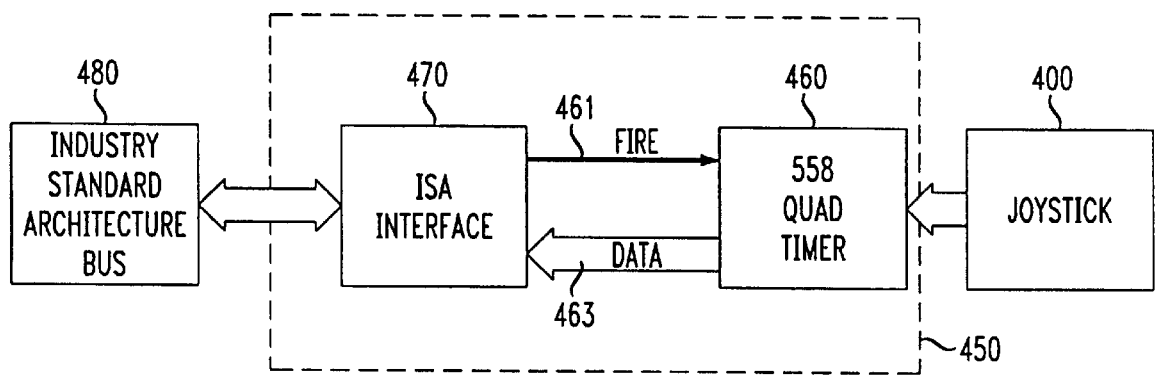
FIG. 2 shows a conventional joystick interface.
Figure 3:
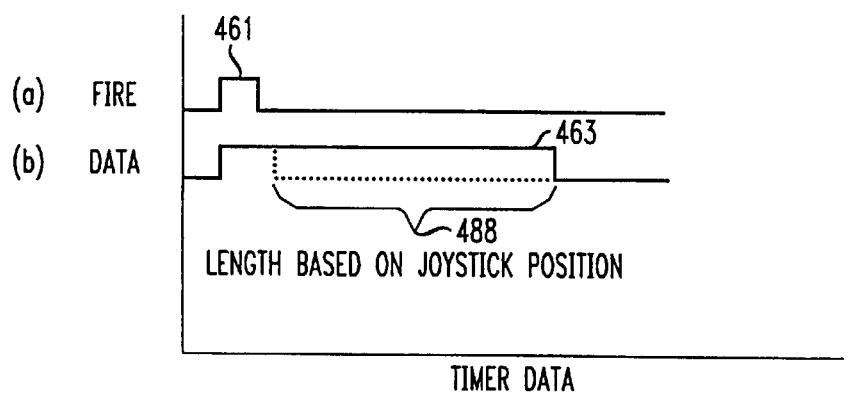
FIG. 3 shows a timing diagram useful in describing the operation of the joystick interface shown in FIG. 1.
Figure 4:
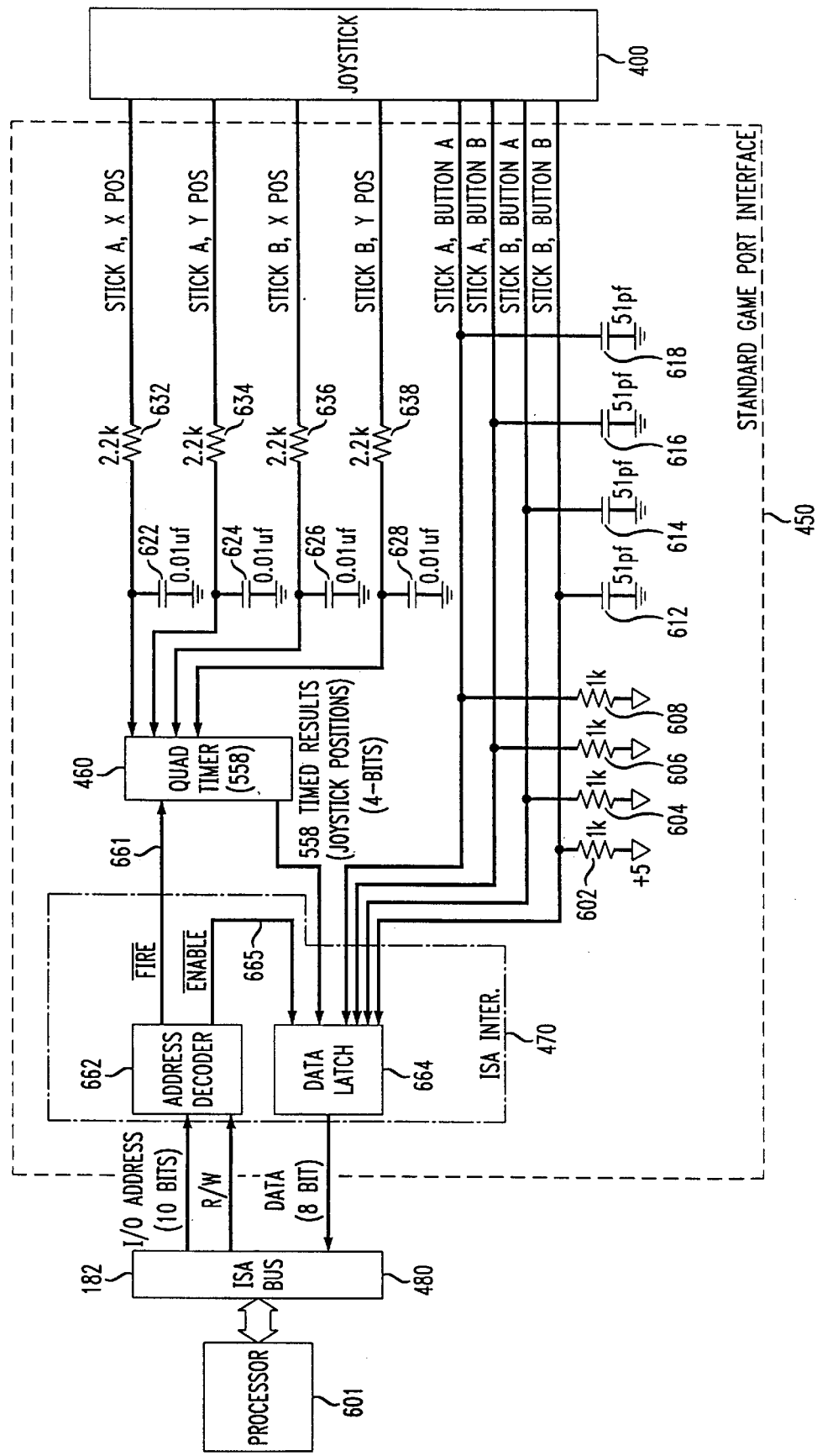
FIG. 4 shows a conventional game port interface in a computer such as a personal computer (PC).

FIG. 1 shows an embodiment of a game port interface in accordance with the principles of the present invention.

In particular, the game port interface 150 in FIG. 1 includes a bus interface such as an ISA interface 470 allowing conventional polling and reading of the position of the conventional joystick device 400. However, importantly, the present invention provides a second access path to the trigger of the game port interface, which in the embodiment shown in FIG. 1 is the 558 quad timer 460. In particular, a data bus 157 in the game port interface includes a first data path 157*a* to the ISA bus interface 470 and a second data path 157*b* to a second processor 154 (e.g., a microcontroller, microprocessor, or digital signal processor). The first data path 157*a* and/or the second data path 157*b* may include appropriate bus control logic such as tri-state buffers to isolate the first data path 157*a* from the second data path 157*b*.

The present invention also includes logic, e.g., an OR gate 152, to allow the game port interface 150 to be triggered either in the conventional fashion using a first fire enable signal 161*a* initiated through the ISA bus interface 470, or using a second fire enable signal 161*b* from a second processor. Thus, the OR gate 152 allows either a first processor to poll the game port interface 150 through the ISA bus interface 470, or a second processor to poll the game port interface 150 directly.

To conserve power in the second processor 154, it may be operated in a low speed mode when possible. Thus, although the second processor 154 may also operate in a low power or halted mode when the first processor utilizing the ISA bus 182 is in a low power or halted mode, the second processor 154 having direct access to the trigger of the game port interface will nevertheless occasionally poll the game port interface 150 to determine if a joystick in the joystick device 450 has been moved.

When the second processor 154 detects movement of a joystick in the joystick device 400, the second processor 154 may communicate with the first processor using the ISA bus interface 470 and ISA bus 182 to initiate a wake up sequence in the first processor.

Thus, in operation, the present invention allows either a conventional processor utilizing an ISA bus to generate a fire enable signal and poll the game port interface, or a second processor having direct access to the game port interface to generate the fire enable signal. Moreover, either processor may read the data from the game port interface without interfering with one another. Once the second processor has read the position of the joystick, it can then determine if movement has occurred and take the appropriate action(s) to remove the first processor from a low power mode.

While the invention has been described with reference to the exemplary embodiments thereof, those skilled in the art will be able to make various modifications to the described embodiments of the invention without departing from the true spirit and scope of the invention.

What is claimed is:

1. A system, comprising:

a host processor;

a second processor; and a joystick interface with a game port;

wherein said second processor is adapted to sense a change in a position of a joystick coupled to said joystick interface while said host processor is in a sleep mode, and to initiate a wake-up procedure in said host processor upon sensing said change in said position of said joystick.

2. A game port interface comprising:

a timing circuit to sense a change in a condition of a joystick interfacing with said game port interface;

a first data bus interface to provide a first processor access to said condition of said joystick; and a second data bus interface to provide a second processor access to said condition of said joystick;

wherein said second processor is adapted to be woken-up from a sleep mode upon a change in condition of said joystick.

3. The game port interface according to claim 2, wherein:

said first data bus interface includes a communication path with said second data bus interface to allow communication from said second processor to said first processor.

4. The game port interface according to claim 2, wherein:

said second processor is a digital signal processor.

5. The game port interface according to claim 2, further comprising:

a logic circuit to allow one of a first polling signal from said first processor and a second polling signal from said second processor to trigger said game port interface.

6. A method of polling a game port interface with a joystick, comprising:

adapting a second processor to sense a change in a position of said joystick coupled to a joystick interface of said game port while a host processor is in a sleep mode, and to initiate a wake-up procedure in said host processor upon sensing said change in said position of said joystick;

placing said host processor in a low power mode; and polling said joystick interface of said game port from said second processor.

7. The method of polling a game port interface with a joystick according to claim 6, further comprising:

polling said joystick interface of said game port from said host processor.

8. The method of polling a game port interface with a joystick according to claim 7, wherein:

said low power mode halts polling from said host processor to said joystick interface.

9. The method of polling a game port interface with a joystick according to claim 7, further comprising:

placing said second processor in a low power mode.

10. Apparatus for polling a game port interface with a joystick, comprising:

means for adapting a second processor to sense a change in position of said joystick coupled to a joystick interface of said game port while a host processor is in a sleep mode, and for initiating a wake-up procedure in said host processor upon sensing said change in said position of said joystick;

means for placing said host processor in a low power mode; and means for polling said joystick interface of said game port from said second processor.

11. The apparatus for polling a game port interface with a joystick according to claim 10, further comprising:

means for polling said joystick interface of said game port from said host processor.

12. The apparatus for polling a game port interface with a joystick according to claim 11, wherein:

said low power mode halts polling from said host processor to said joystick interface.

13. The apparatus for polling a game port interface with a joystick according to claim 11, further comprising:

means for placing said second processor in a low power mode.

\* \* \* \* \*